United States Patent
Naveh et al.

(10) Patent No.: US 8,726,048 B2
(45) Date of Patent: *May 13, 2014

(54) POWER MANAGEMENT COORDINATION IN MULTI-CORE PROCESSORS

(75) Inventors: Alon Naveh, Ramat Hasharon (IL); Efraim Rotem, Hafia (IL); Eliezer Weissmann, Hafia (IL)

(73) Assignee: Intel Corporation, Santa Clara, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/165,415

(22) Filed: Jun. 21, 2011

(65) Prior Publication Data

US 2011/0252267 A1 Oct. 13, 2011

Related U.S. Application Data

(63) Continuation of application No. 10/899,674, filed on Jul. 27, 2004, now Pat. No. 7,966,511.

(51) Int. Cl.
*G06F 1/32* (2006.01)

(52) U.S. Cl.
USPC .......................................... 713/300

(58) Field of Classification Search
USPC ................................. 713/501, 300
See application file for complete search history.

(56) References Cited

U.S. PATENT DOCUMENTS

| | | |
|---|---|---|
| 5,307,003 A | 4/1994 | Fairbanks et al. |
| 5,502,838 A | 3/1996 | Kikinis |
| 5,526,487 A | 6/1996 | Schiffleger |
| 5,592,671 A | 1/1997 | Hirayama |
| 5,627,412 A | 5/1997 | Beard |
| 5,745,375 A | 4/1998 | Reinhardt et al. |
| 5,787,294 A | 7/1998 | Evoy |
| 5,812,860 A | 9/1998 | Horden et al. |
| 5,862,368 A | 1/1999 | Miller et al. |
| 5,870,616 A | 2/1999 | Loper et al. |
| 5,918,061 A | 6/1999 | Nikjou |

(Continued)

FOREIGN PATENT DOCUMENTS

| | | |
|---|---|---|
| CN | 1993669 | 7/2007 |
| DE | 11 2005 001 779 | 5/2007 |

(Continued)

OTHER PUBLICATIONS

Non-Final Office Action for Japanese Patent Application No. 2007-522581, mailed Jan. 5, 2010, 3 pages.

(Continued)

*Primary Examiner* — Kim Huynh
*Assistant Examiner* — Eric Chang
(74) *Attorney, Agent, or Firm* — Blakely, Sokoloff, Taylor & Zafman LLP

(57) ABSTRACT

Systems and methods of managing power provide for issuing a first operating requirement from a first processor core and issuing a second operating requirement from a second processor core. In one embodiment, the operating requirements can reflect either a power policy or a performance policy, depending upon the factor that is currently most important to software. Hardware coordination logic is used to coordinate a shared resource setting with the operating requirements. The hardware coordination logic is also able to coordinate the shared resource setting with independent resource settings of the first and second processor cores based on the operating requirements.

33 Claims, 5 Drawing Sheets

(56) References Cited

U.S. PATENT DOCUMENTS

| | | | |
|---|---|---|---|
| 5,953,685 | A | 9/1999 | Bogin et al. |
| 6,047,248 | A | 4/2000 | Georgiou et al. |
| 6,115,763 | A | 9/2000 | Douskey et al. |
| 6,363,490 | B1 | 3/2002 | Senyk |
| 6,415,388 | B1 | 7/2002 | Browning et al. |
| 6,438,658 | B1 | 8/2002 | Baliga et al. |
| 6,550,020 | B1 | 4/2003 | Floyd et al. |
| 6,691,216 | B2 | 2/2004 | Kelly et al. |
| 6,711,447 | B1 | 3/2004 | Saeed |
| 6,711,691 | B1 | 3/2004 | Howard et al. |
| 6,714,891 | B2 | 3/2004 | Dendinger |
| 6,804,790 | B2 | 10/2004 | Rhee et al. |
| 6,859,882 | B2 * | 2/2005 | Fung .............................. 713/300 |
| 6,885,233 | B2 | 4/2005 | Huard et al. |
| 6,983,386 | B2 | 1/2006 | Barr et al. |
| 7,043,405 | B2 | 5/2006 | Orenstien et al. |
| 7,043,649 | B2 | 5/2006 | Terrell, II |
| 7,076,672 | B2 | 7/2006 | Naveh et al. |
| 7,127,560 | B2 | 10/2006 | Cohen et al. |
| 7,134,031 | B2 * | 11/2006 | Flautner ........................ 713/300 |
| 7,136,984 | B2 | 11/2006 | Maiyuran et al. |
| 7,360,103 | B2 * | 4/2008 | Lint et al. ...................... 713/300 |
| 7,437,513 | B2 | 10/2008 | Saida et al. |
| 7,451,333 | B2 | 11/2008 | Naveh et al. |
| 7,502,887 | B2 | 3/2009 | Tanaka et al. |
| 7,546,418 | B2 | 6/2009 | Verdun |
| 7,664,970 | B2 | 2/2010 | Jahagirdar et al. |
| 2002/0007463 | A1 | 1/2002 | Fung |
| 2002/0083356 | A1 | 6/2002 | Dai |
| 2002/0095610 | A1 | 7/2002 | Nunomura |
| 2003/0101362 | A1 | 5/2003 | Dia |
| 2004/0098631 | A1 | 5/2004 | Terrell, II |
| 2004/0117678 | A1 | 6/2004 | Soltis et al. |
| 2006/0047986 | A1 | 3/2006 | Kurts et al. |
| 2006/0053326 | A1 | 3/2006 | Naveh et al. |
| 2006/0143485 | A1 | 6/2006 | Naveh et al. |
| 2007/0043965 | A1 | 2/2007 | Mandelblat et al. |
| 2007/0156992 | A1 | 7/2007 | Jahagirdar |
| 2007/0157036 | A1 | 7/2007 | Jahagirdar et al. |

FOREIGN PATENT DOCUMENTS

| | | |
|---|---|---|
| EP | 0978781 | 7/1999 |
| EP | 1286248 | 2/2003 |
| EP | 142628 | 6/2004 |
| JP | 10091603 | 4/1998 |
| JP | 2000-066776 | 3/2000 |
| JP | 2008507766 | 3/2008 |
| TW | 538342 | 6/2003 |
| TW | 200625069 | 7/2006 |
| WO | WO-0101228 | 4/2001 |
| WO | WO-01/35200 | 5/2001 |
| WO | WO-02/17052 | 2/2002 |
| WO | WO-2005048112 | 5/2005 |

OTHER PUBLICATIONS

Second Office Action for Chinese Patent Application No. 200580025704.3, mailed Mar. 25, 2010, 15 pages.
First Office Action for Chinese Patent Application No. 200580025704.3, mailed Apr. 18, 2008, 42 pages.
Decision on Rejection for Chinese Patent Application No. 200580025704.3, mailed Jan. 9, 2009, 30 pages.
Notice of Allowance and Fees for Chinese Patent Application No. 200580025704.3, mailed Mar. 21, 2011, 4 pages.
Non-Final Office Action for German Patent Application No. 112005001779.6-53, mailed Apr. 7, 2010, 6 pages.
Non-Final Office Action for German Patent Application No. 112005001779.6-53, mailed Aug. 24, 2010, 4 pages.
International Search Report and Written Opinion for PCT Patent Application No. PCT/US2005/025088, mailed Jan. 2, 2006, 12 pages.
Non-Final Office Action for U.S. Appl. No. 10/899,674, mailed Mar. 19, 2007, 18 pages.
Notice of Allowance and Fees for U.S. Appl. No. 10/899,674, mailed May 7, 2008, 6 pages.
Notice of Allowance and Fees for U.S. Appl. No. 10/899,674, mailed Sep. 8, 2010, 6 pages.
Notice of Allowance and Fees for U.S. Appl. No. 10/899,674, mailed Feb. 8, 2011, 5 pages.
International Search Report and Written Opinion for PCT Patent Application No. PCT/US2005/028699, mailed May 8, 2006, 10 pages.
Office Action for Taiwanese Patent Application No. 94124132, mailed Aug. 13, 2009, 5 pages.
International Preliminary Report on Patentability for PCT Patent Application No. PCT/US2005/025088, mailed Feb. 8, 2007, 7 pages.
Final Office Action for Japanese Patent Application No. 2007-522581, mailed Sep. 28, 2010, 6 pages.
International Search Report and Written Opinion for PCT Patent Application No. PCT/US2006/048296, mailed Jun. 6, 2007, 14 pages.
International Search Report for PCT Patent Application No. PCT/US2003/30573, mailed May 28, 2004, 17 pages.
Notice of Allowance and Fees for U.S. Appl. No. 10/899,674, mailed Jan. 26, 2010, 13 pages.
Notice of Allowance and Fees for U.S. Appl. No. 10/899,674, mailed Apr. 3, 2009, 8 pages.
Notice of Allowance and Fees for U.S. Appl. No. 10/899,674, mailed Oct. 7, 2008, 12 pages.
Supplemental Notice of Allowance for U.S. Appl. No. 10/899,674, mailed Dec. 31, 2008, 2 pages.
Written Opinion for PCT Patent Application No. PCT/US2005/028699, mailed Aug. 15, 2008, 8 pages.
International Written Opinion for PCT Patent Application No. PCT/US2003/30573, mailed Jun. 12, 2006, 7 pages.
Non-Final Office Action for European Patent Application No. 03754955.7, mailed Jun. 2, 2009, 4 pages.
Office Action for Japanese Patent Application No. 2007-522581, mailed May 17, 2011, 6 pages.
Office Action for Taiwanese Patent Application No. 94124132, mailed Nov. 13, 2008, 24 pages.
International Preliminary Examination Report for PCT Patent Application No. PCT/US2003/30573, mailed Oct. 20, 2006, 7 pages.
Non-Final Office Action for U.S. Appl. No. 10/899,674, mailed Oct. 4, 2007, 7 pages.
Notice of Allowance for U.S. Appl. No. 10/272,149, mailed Jan. 5, 2006, 7 pages.
Non-Final Office Action for U.S. Appl. No. 10/272,149, mailed Jun. 16, 2005, 12 pages.
Non-Final Office Action for Korean Patent Application 10-2005-7006355, mailed Aug. 31, 2006, 4 pages.
Non-Final Office Action for European Patent Application No. 03754955.7, mailed May 8, 2007, 7 pages.
Non-Final Office Action for China Patent Application No. 03147090.4, mailed Nov. 11, 2005, 15 pages.
Non-Final Office Action for China Patent Application No. 03147090.4, mailed Mar. 18, 2005, 7 pages.
Notice of Allowance and Fees for U.S. Appl. No. 10/934,034, mailed Jul. 1, 2008, 4 pages.
International Preliminary Report on Patentability for Application No. PCT/US2006/048296, mailed Jul. 1, 2008, 7 pages.
Written Opinion for Application No. PCT/US2006/048296, mailed Jun. 6, 2007, 6 pages.
"Advanced Configuration and Power Interface Specification", Compaq Computer Corporation, Intel Corporation, Microsoft Corporation, Phoenix Technologies Ltd. Toshiba Corporation. Revision 2.0b; Chapter 8, Oct. 11, 2002, pp. 219-232.
Invitation to Pay Additional Fees and Annex (partial International Search) for PCT Patent Application No. PCT/US2005/028699, mailed Mar. 2, 2006, 10 Pages.

* cited by examiner

| Combined Optimal State | | | | Shared Feature SpeedStep® Control | | | | Independent Feature TM1 Control | | |
|---|---|---|---|---|---|---|---|---|---|---|
| Pindex | Perf | Abs-Pwr | Pwr% | Frequency | Vcc | Pwr% | Perf | Throttle% | Pwr% | Perf |
| 0 | 1 | 100 | 100% | 1700 | 1.233 | 100% | 100% | 0 | 1 | 100% |
| 1 | 0.97 | 84 | 84% | 1600 | 1.183 | 84% | 97% | 0 | 1 | 100% |
| 2 | 0.94 | 68 | 68% | 1500 | 1.133 | 68% | 94% | 0 | 1 | 100% |
| 3 | 0.91 | 54 | 54% | 1400 | 1.083 | 54% | 91% | 0 | 1 | 100% |
| 4 | 0.88 | 41 | 41% | 1300 | 1.008 | 41% | 88% | 0 | 1 | 100% |
| 5 | 0.85 | 28 | 28% | 1200 | 0.933 | 28% | 85% | 0 | 1 | 100% |
| 6 | 0.82 | 16 | 16% | 1100 | 0.85 | 16% | 82% | 0 | 1 | 100% |
| 7 | 0.79 | 15 | 15% | 1000 | 0.85 | 15% | 79% | 0 | 1 | 100% |
| 8 | 0.76 | 13 | 13% | 900 | 0.85 | 13% | 76% | 0 | 1 | 100% |
| 9 | 0.73 | 12 | 12% | 800 | 0.85 | 12% | 73% | 0 | 1 | 100% |
| 10 | 0.7 | 10 | 10% | 700 | 0.85 | 10% | 70% | 0 | 1 | 100% |
| 11 | 0.67 | 9 | 9% | 600 | 0.85 | 9% | 67% | 0 | 1 | 100% |
| 12 | 0.58625 | 8 | 8% | 600 | 0.85 | 9% | 67% | 0.125 | 0.9063 | 88% |
| 13 | 0.5025 | 7 | 7% | 600 | 0.85 | 9% | 67% | 0.25 | 0.8125 | 75% |
| 14 | 0.41875 | 6 | 6% | 600 | 0.85 | 9% | 67% | 0.375 | 0.7188 | 63% |
| 15 | 0.335 | 6 | 6% | 600 | 0.85 | 9% | 67% | 0.5 | 0.625 | 50% |
| 16 | 0.1675 | 4 | 4% | 600 | 0.85 | 9% | 67% | 0.75 | 0.4375 | 25% |

FIG. 4
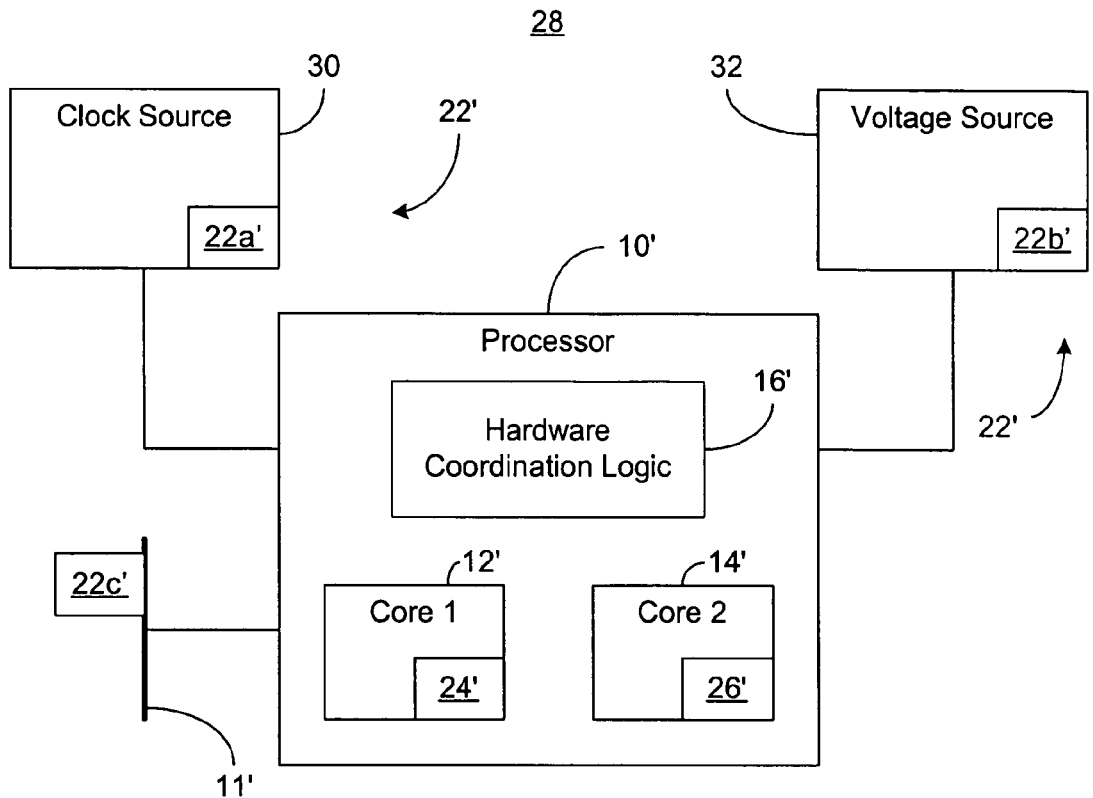
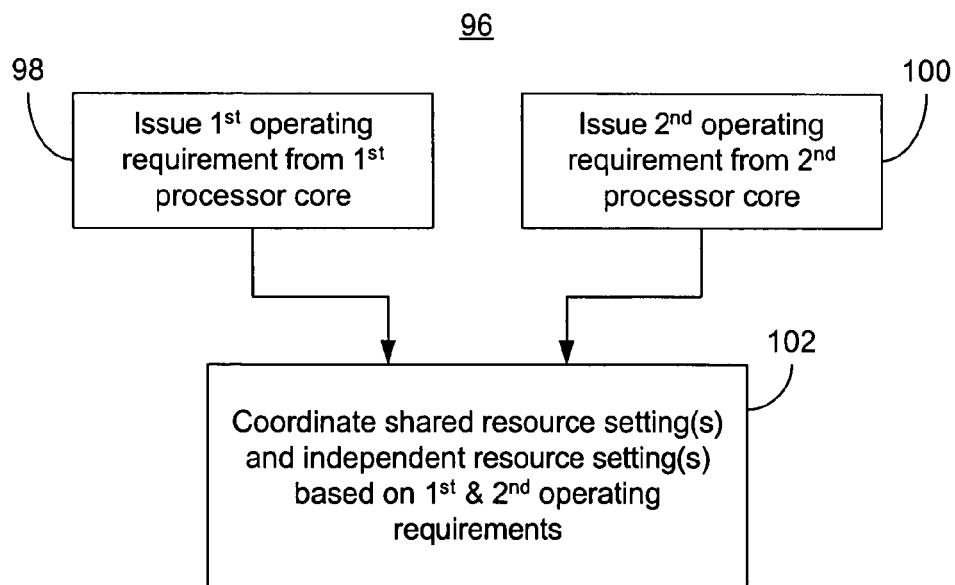
FIG. 5

POWER MANAGEMENT COORDINATION IN MULTI-CORE PROCESSORS

PRIORITY CLAIM

This continuation application is related to, and claims priority to, U.S. patent application Ser. No. 10/899,674, entitled "POWER MANAGEMENT COORDINATION IN MULTI-CORE PROCESSORS" filed on Jul. 27, 2004, now issued as U.S. Pat. No. 7,966,511, which is hereby incorporated by reference herein as though set forth in full.

BACKGROUND

1. Technical Field

One or more embodiments of the present invention generally relate to power management. In particular, certain embodiments relate to coordinating power management activities in multi-core processors.

2. Discussion

As the trend toward advanced processors with more transistors and higher frequencies continues to grow, computer designers and manufacturers are often faced with corresponding increases in power consumption. Furthermore, manufacturing technologies that provide faster and smaller components can at the same time result in increased leakage power. Particularly in mobile computing environments, increased power consumption can lead to overheating, which may negatively affect performance, and can significantly reduce battery life.

Some modern mobile computing systems address the concern over reduced battery life by implementing processor-based power management schemes. For example, one of the more popular approaches is to dynamically lower processor power consumption by scaling down the core voltage and clock frequency of the processor when high performance is not needed or desired. Power management can also be enhanced by scaling the frequency of the bus that the processor uses to communicate with other components such as chipsets, memory subsystems, input/output (I/O) devices, etc. Another approach is to switch, or "gate", the clock to the processor on and off (i.e., "throttle" the clock) to achieve power savings. Yet another example of processor-based power management is to throttle architectural components of the processor such as internal arrays, execution units, and so on. Some techniques make use of various combinations of these approaches to further reduce power consumption. While these power management schemes have been acceptable under certain circumstances, a number of concerns remain.

One concern relates to recent trends toward more complex processor architectures, which can include multiple processors in a system, with multiple cores on each processor. In such a case, some of the power-related resources and associated controls may be shared among processor cores, where other resources and controls may be dedicated to a given core. The dedicated resources and controls are independent from the resources and controls of other cores, where the shared resources and controls depend upon the state of each of the cores. Conventional power management schemes, however, may not work well in these cases because they are structured for single-processor environments.

For example, one such scheme controls transitions of the processor between various power states at the operating system (OS) level. Although future OS implementations may be able to manage power on a per core basis, it is not at all clear whether the OS will be able to coordinate between the cores. Furthermore, even if OS implementations were to achieve per core power management, efficiency may still be an issue of concern. In particular, the OS may not be aware of all of the available performance/power control mechanisms and may not be able to balance the trade-offs between them. In addition, relying on software to coordinate such complicated architectures could increase OS overhead and contribute to software calculation complexity. Software-based power management of multi-core processors may also be difficult to implement from a timing standpoint because of the rapid state changes that can occur in inter-dependent cores.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a block diagram of an example of a system according to one embodiment of the invention;

FIG. 5 is a flowchart of an example of a method of managing power according to one embodiment of the invention;

FIG. 8 is a flowchart of an example of a process of adjusting resource settings according to one embodiment of the invention.

DETAILED DESCRIPTION

Figure 1:
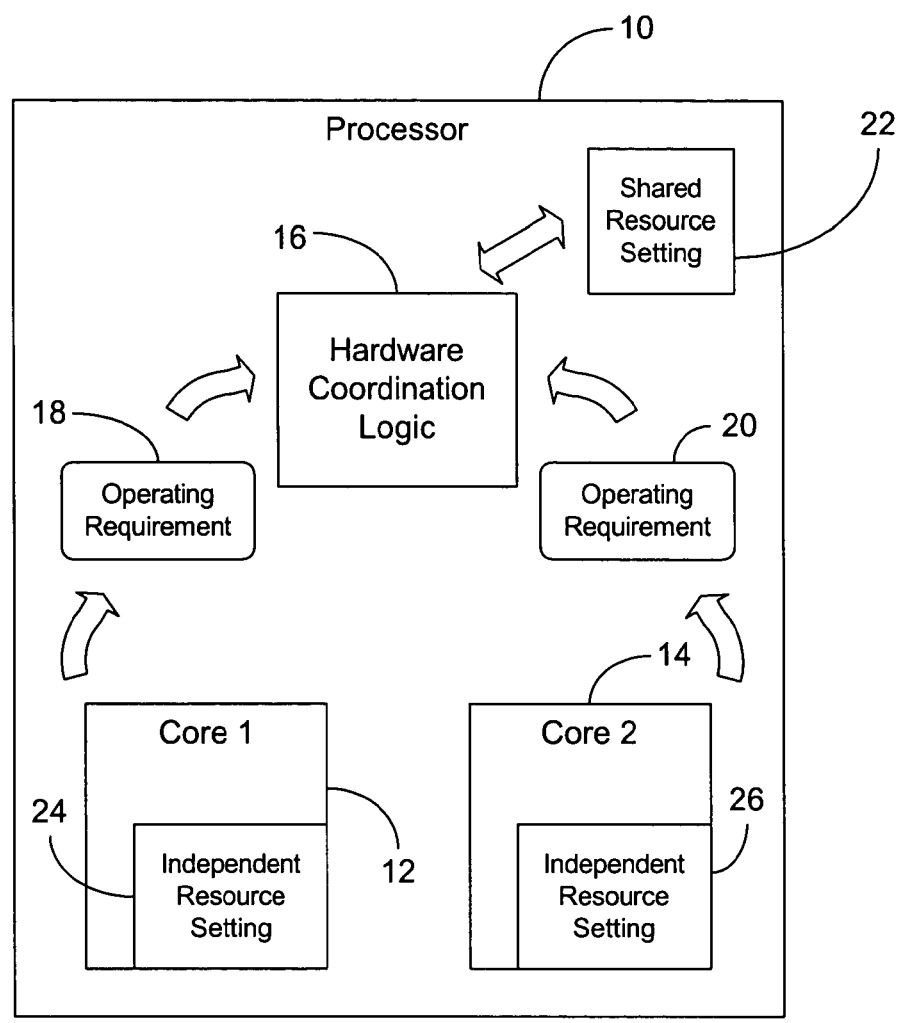
FIG. 1 is a block diagram of an example of a processor according to one embodiment of the invention.

FIG. 1 shows a processor 10 having a first core 12, a second core 14 and hardware coordination logic 16 operatively coupled to the first core 12 and the second core 14. The terms "first" and "second" are used herein for ease of discussion only. Furthermore, while a dual-core configuration is shown here, the number of cores in the processor 10 can readily be increased without parting from the spirit and scope of the embodiments of the invention. Each of the illustrated cores 12, 14 are fully functional as logical processors and include traditional execution units, level one (L1) caches, etc. The illustrated dual-core configuration can therefore provide substantial performance benefits over conventional single-core processors.

The processor 10 has a number of features/resources that enable a significant reduction in power. For example, the processor 10 may have a feature that is able to scale down the processor clock frequency and power supply voltage (e.g., core voltage) when high performance is either not needed or not desired. Another power saving feature might provide for scaling the clock frequency of a bus (not shown). Yet another feature could provide for throttling (or "gating") the clocks off and on, which reduces power consumption. Clock throttling can be conducted at the package level or to individual portions of the processor 10. Yet another power saving feature might involve throttling architectural components of the cores 12, 14 in order to reduce power and/or decrease temperature.

While each of these features can be quite beneficial from a power management standpoint, some of them make use of resources that are shared by the cores 12, 14, and others concern resources that are independently controlled by the cores 12, 14. The illustrated processor 10 generally has an architecture that is able to dynamically support both scenarios, and provides a number of advantages over conventional power management schemes.

For example, the illustrated processor 10 may have a processor clock frequency setting and a power supply voltage setting that are shared by both cores 12, 14, whereas an independent clock throttle setting may control how often the clock is applied to the first core 12 only. Thus, the clock frequency and power supply voltage settings could be viewed as a shared resource setting 22 and the independent clock throttle setting could be viewed as an independent resource setting 24. Similarly, the second core 14 may also have an independent clock throttle setting that is represented by an independent resource setting 26.

In addition to independent clock throttling, the cores 12, 14 may be able to independently throttle various functional blocks of their internal architectures. For example, the independent resource settings 24, 26 could provide for the throttling of architectural components such as internal arrays, reorder buffers (ROBs), reservation station (RS) tables, parallel units, execution units, and so on.

In the illustrated embodiment, the first core 12 issues a first operating requirement 18 and the second core 14 issues a second operating requirement 20. The coordination logic 16 can coordinate the shared resource setting 22 with the operating requirements 18, 20. As will be discussed in greater detail below, the operating requirements 18, 20 could be generated according to a policy such as a power policy or a performance policy, and may be a product of the operating system (OS) running on each of the cores 12, 14. For example, the first core 12 might have user/software selectable power goals that allow it to reduce power consumption by twenty percent. In this case, the first operating requirement 18 could be a power requirement that indicates an eighty percent power level. Alternatively, the second core 12 might be in a mode of operation that requires full power so that the second operation requirement 20 indicates a one hundred percent power level. Specific values are used by way of example, only.

The operating requirements 18, 20 could also identify a performance requirement such as a performance level or an index into a performance state transition table, as discussed in greater detail below. By enabling the hardware coordination logic 16 to function based on either a performance or a power policy, the processor 10 is able to focus on what is currently the most important factor for software to control, while perhaps compromising the other. Although using performance/power policies can be helpful when coordinating across multiple features and a common policy (performance or power) is needed, other approaches may be used. For example, incorporating the actual resource settings into the operating requirements may also be an acceptable approach.

As already noted, the coordination logic 16 can select the shared resource setting 22 according to the first operating requirement 18 and the second operating requirement 20. The result is an operating state that may or may not be meet the operating requirements 18, 20. If, for example, the first operating requirement 18 is not satisfied by the shared resource setting 22, the first core 12 selects a modified/adjusted value for the first independent resource setting 24 that enables the first operating requirement 18 to be satisfied. Alternatively, if the second operating requirement 20 is not satisfied by the shared resource setting 22, the second core 14 selects a modified/adjusted value for the second independent resource that enables the second operating requirement 20 to be satisfied. The coordination logic 16 may therefore determine the resulting independent resource settings 24, 26, based on the difference between the individual operating requirements 18, 20, and the shared resource setting 22, which reflects the actual achieved coordinated state. Simply put, the independent resource settings 24, 26 are able to compensate for any power/performance deficiencies associated with the shared resource setting 22, which may be constrained by one or more of the cores 12, 14.

Thus, in the above example of mismatched operating requirements, the coordination logic 16 would take into consideration the fact that the second core 14 requires a higher power level, and would select the coordinated shared resource setting 22 to satisfy this requirement. The shared resource setting 22 would therefore result in an operating state of one hundred percent power for both cores 12, 14, and the first core 12 would still have an operating requirement 18 of eighty percent. Since the first core 12, has not yet satisfied the first operating requirement 18, the first core 12 selects a corrected/adjusted value for the first independent resource setting 24 that enables the first operating requirement 18 to be satisfied. For example, the first core 12 might increase its independent clock throttle setting to achieve the desired twenty percent reduction in power. Thus, by coordinating the shared resource setting 22 with the independent resource settings 24, 26, the coordination logic 16 is able to manage power efficiently in a multi-core environment.

The coordination logic 16 can select the shared resource setting 22 by translating the first operating requirement 18 into a first target value and translating the second operating requirement 20 into a second target value, where the target values represent potential values for the shared resource setting 22. The coordination logic 16 may then compare the first target value to the second target value and select the higher of the two as the shared resource setting 22. It should also be noted that, the coordination logic 16 could simply compare the operating requirements 18, 20 and select the higher of the two. The coordination logic 16 is therefore able to function as a "maximum detector" for operating requirements and/or target values of the shared resource setting 22.

Alternatively, the coordination logic 16 may select the lesser value if a "minimum-of-both-requests" coordination policy is appropriate. Such a situation might occur in the case of shared clock throttling or if the OS decides to set a "Force_Min" flag in the controls, where the Force_Min flag could notify the coordination logic 16 that it needs to enforce a MINIMUM operating point policy, ensuring that the minimum of both cores' individual throttling request is the one selected. For simplicity, some of the examples described herein will refer to the coordination policy as a maximum. It should be noted, however, that the advantages associated with the embodiments of the invention can also apply to minimum policies.

If the second core 14 subsequently issues a modified operating requirement that corresponds to a reduced target value, the coordination logic 16 is able to adjust the shared resource setting 22 based on the modified operating requirement. In such a case, the first core 12 could adjust the independent resource setting 24 based on the adjusted shared resource setting. In the above example of mismatched operating requirements, the first core 12 might reduce its independent clock throttle setting (because it is no longer needed). It should be noted that by implementing the coordination logic in hardware, fast OS response times in order to accommodate rapid state changes are not imposed on the system. It should also be noted that if the independent resource settings 24, 26 are known to be more efficient than the shared resource setting 22, the above-described process may be reversed so that the independent resource settings 24, 26 are selected first, with the shared resource setting 22 compensating for the independent resource settings 24, 26.

Figures 2, 3:
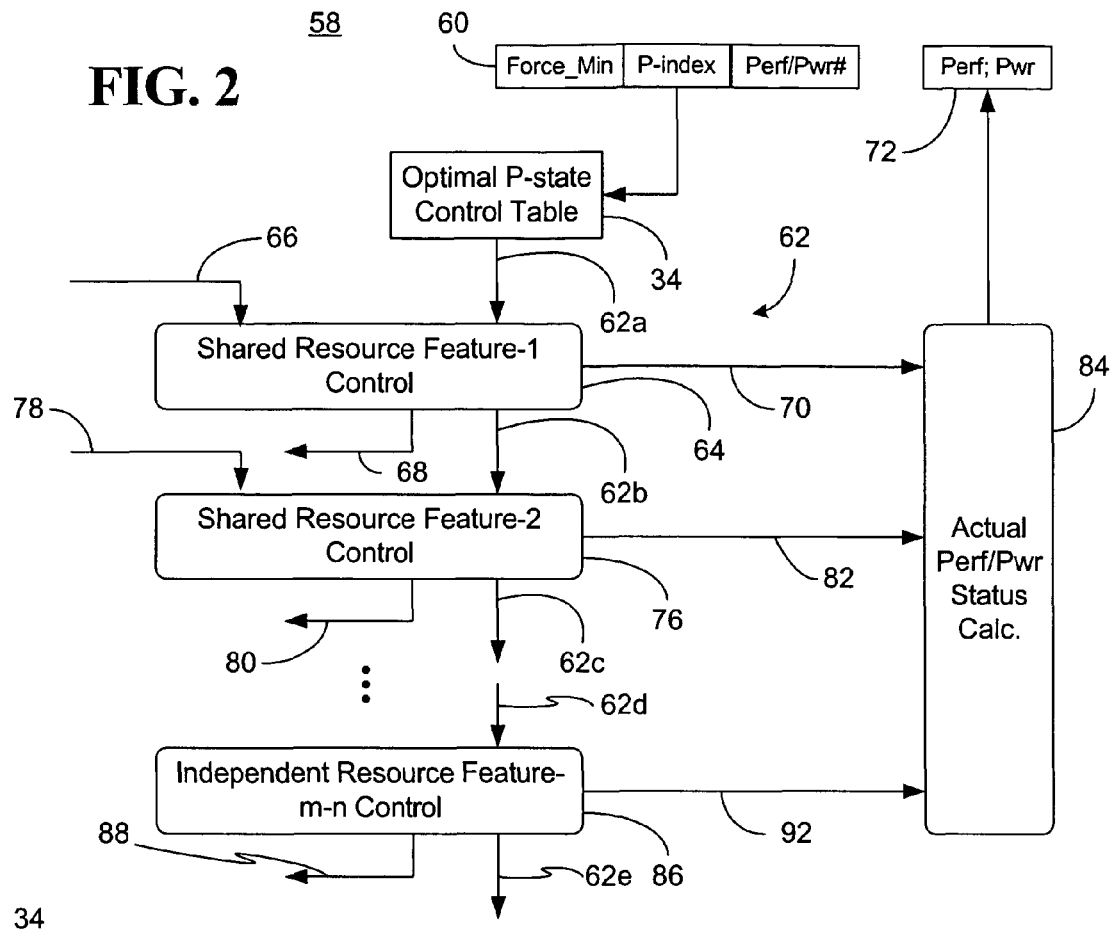
FIG. 2 is a diagram of an example of a power management architecture according to one embodiment of the invention.
FIG. 3 is a diagram of an example of a performance state transition table according to one embodiment of the invention.

FIGS. 2 and 3 show a power management architecture 58 that can be used to implement hardware coordination logic and a performance state transition table 34 that can be used to facilitate the above-described translation, respectively. While the architecture 58 and the table 34 can be very helpful in managing power, other approaches may be used. In the illustrated example, a performance state ("P-state") activation command 60, which defines operating requirement characteristics such as a force minimum characteristic, performance index, performance level and/or power level for each processor core is used to access the performance state transition table 34.

Although only a single activation command 60 is shown, multiple activation commands can be applied to the table 34 simultaneously.

In the illustrated example, the operating requirements can be defined as power requirements such as a combined optimal state absolute power ("Abs-Pwr") 42 or a power percentage ("Pwr %") 44. The operating requirements could also be defined as performance requirements such as a performance index ("Pindex") 50 or a combined optimal state absolute performance ("Perf") 52. To support relatively complex hardware coordination, it can be seen that shared resource settings may be integrated across various features and the actual operating requirements may be specified at a "global" level. Thus, in the illustrated example, the activation commands 60 include operating requirements that refer to the combined optimal state.

As already noted, the target values for the resource settings can be identified by feature, where the Speedstep® feature ("Shared Feature") may provide control over shared resource settings, which are illustrated as clock frequency settings ("Frequency") 36 and core voltage settings ("$V_{cc}$") 38. The TM1 feature ("Independent Feature"), on the other hand, may provide control over independent resource settings, which are illustrated as independent clock throttle settings ("Throttle %") 40. As the operating requirements and target values are received by the coordination logic, they can be compared to one another for selection of an appropriate global setting.

In another particular example, if the first core requests an 88% performance level, the coordination logic can use the 88% performance "operating requirement" to index into the combined optimal state portion of the table. A target frequency/voltage value of 1300 MHz/1.008V can be extracted from the table and placed on a control bus 62 (62a-62e) for delivery to a first shared resource control block 64. The illustrated first shared resource control block 64 therefore corresponds to the shared feature shown in the table 34. Simultaneously with the first core request, the second core may issue an operating requirement such as a request to operate at the 100% performance level. The coordination logic can therefore use the 100% performance to index into the combined optimal state portion of the table, extract the target frequency/voltage value of 1700 MHz/1.233V from the table, and place it on the control bus 66.

If the illustrated system is in the "max detect" mode (i.e., Force_Min is not set), the first shared resource control block 64 compares the two operating requirements and determines that the appropriate global setting is 100% performance. Accordingly, the target frequency/voltage value of 1700 MHz/1.233V may be selected as the shared resource setting 68. In the illustrated example, the shared resource setting 68 is applied to the clock source and/or voltage source, instructing the shared resources to operate at the appropriate frequency and/or core voltage defined by the shared resource setting 68. The first shared resource control block 64 also sends an operating state signal 70 to status calculation logic 84, which generates an actual operating state calculation 72. The operating state signal 70 identifies the performance and/or power state resulting from the shared resource setting 68. Thus, in this example the operating state signal 70 would identify the 100% performance level.

In addition, the first shared resource control block 64 can generate corrected operating requirements and/or target values based on the shared resource setting 68 and place the corrected target values on the control bus 62b, where the corrected target values enable a second shared resource control block 76 to determine a shared resource setting 80 for the next shared resource. The corrected values correspond to the selected operating level and can be extracted from a table such as the table 34 (although only one shared feature is illustrated in the table). In the illustrated example, the shared resource setting 80 could be a bus frequency setting. The second shared resource control block 76 also collects operating requirements and/or target values of one or more other processor cores from a control bus 78 and determines the maximum in the set. This maximum represents the shared resource setting 80, which instructs the clock to operate at the appropriate shared resource setting. An operating state signal 82 is also sent to the status calculation logic 84. If additional resource control blocks are needed, corrected operating requirement and/or target values are generated and placed on the control bus 62c.

When the shared resource settings have all been completed, the power management architecture 58 provides for the use of an independent resource control block 86 to generate an independent resource setting 88, where the independent resource setting 88 enables the processor core in question to achieve any additional power savings reflected in a corrected operating requirement on control bus 62d. The corrected operating requirement can be obtained from the last of the shared resource control blocks. In the above example of a first core in need of an 88% performance level, the independent resource control block 86 might select an independent resource setting of 0.125 independent clock throttle, which provides 88% performance. The illustrated global setting of P12 also includes a 67% performance reduction through the shared voltage/freq setting, which if combined with the 0.125 independent clock throttle gives you 57% performance overall. However, the approach described herein compensates for the performance number by using the independent resource setting when the shared resource has been already selected and fixed. The independent resource control block 86 is also able to generate an operating state signal 92 for use in generating the actual operating state calculation 72. If the independent resource setting 88 is not able to fully satisfy the corrected operating requirement, another corrected operating requirement can be sent to the next independent resource control block (not shown) on control bus 62e.

Turning now to FIG. 4, one example of a system 28 having a clock source 30 with a shared frequency setting 22a', a bus 11 with a shared frequency setting 22c', a voltage source 32 with a shared voltage setting 22b' and a multi-core processor 10'. The system 28 could be part of a mobile computing system such as a notebook personal computer (PC), a personal digital assistant (PDA), a wireless "smart" phone, etc., in which power consumption and overheating are issues of particular concern. The illustrated processor 10' has a first core 12', a second core 14' and hardware coordination logic 16'. The first core 12' issues a first operating requirement (not shown) and the second core 14' issues a second operating requirement (not shown). The coordination logic 16' coordinates the shared frequency settings 22' (22a'-22c') with the operating requirements and with the independent resource settings 24', 26' of the first and second cores 12', 14', respectively.

FIG. 5 shows a method 96 of managing power. The method 96 can be implemented in a multi-core processor using any available hardware and/or software programming technique. For example, one or more portions of the method 96 can be embodied in fixed functionality hardware, an application specific integrated circuit (ASIC), in a set of microcode instructions to be stored on a machine readable medium, or any combination thereof. In particular, the illustrated method 96 provides for issuing a first operating requirement from a first processor core at processing block 98. A second operating requirement is issued from a second processor core at block 100. Block 102 provides for coordinating a shared resource setting with the operating requirements. The shared resource setting is already coordinated with an independent resource setting based on the first operating requirement and the second operating requirement. The independent resource setting could be dedicated to the first processor core or the second processor core.

Figure 6:
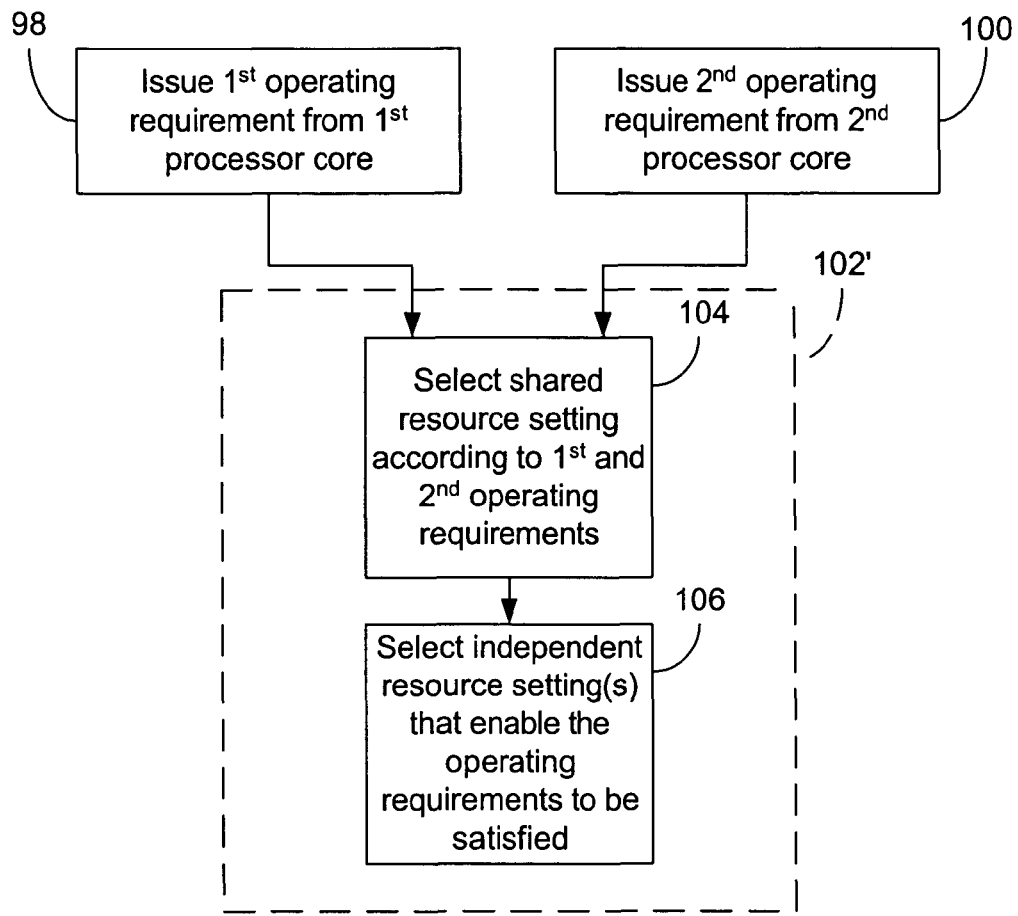
FIG. 6 is a flowchart of an example of a process of coordinating a shared resource setting with an independent resource setting according to one embodiment of the invention.

Turning now to FIG. 6, one approach to coordinating a shared resource setting is shown in greater detail at block 102'. In particular, block 104 provides for selecting the shared resource setting according to the first operating requirement and the second operating requirement. Block 106 provides for selecting adjusted values for the independent resource settings that enable the operating requirements to be satisfied.

Figure 7:
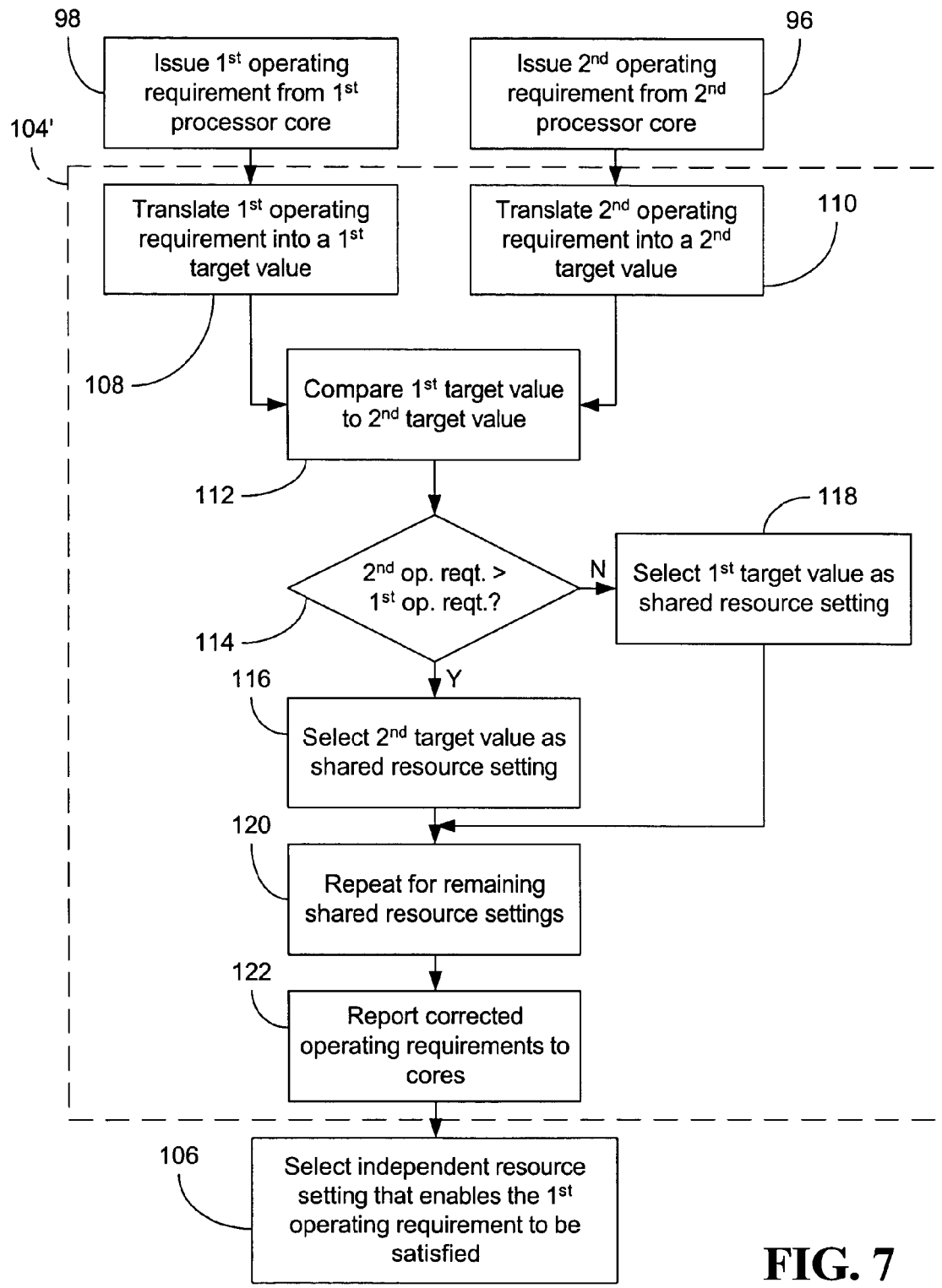
FIG. 7 is a flowchart of an example of a process of selecting a shared resource setting according to one embodiment of the invention.

FIG. 7 shows one approach to selecting a shared resource setting in greater detail at block 104'. In the illustrated example, the first operating requirement is translated into a first target value at block 108 and the second operating requirement is translated in to a second target value at block 110. As already discussed, the translation at blocks 108 and 110 can be facilitated by the use of a power state transition table. Block 112 provides for comparing the first operating requirement to the second operating requirement. Alternatively, the target values themselves can be compared. If it is determined at block 114 that the second operating requirement is greater than the first operating requirement, block 116 provides for selecting the second target value as the shared resource setting. Otherwise, the first target value is selected as the shared resource setting at block 118. Block 120 provides for repeating the shared resource setting selection process for the remaining shared resources, if necessary. A corrected operating requirement that results from the shared resource settings is reported to the cores at block 122.

Turning now to FIG. 8, a process 124 of updating shared resource settings and independent resource settings is shown. In the illustrated example, the second processor core has previously required a higher level of performance than the first processor core. Accordingly, the first processor core is using independent resource settings to compensate the shared resource setting. Block 126 provides for issuing a modified operating requirement from the second processor core. The shared resource setting is adjusted at block 128 based on the modified operating requirement. Block 130 provides for adjusting the independent resource settings of the first processor core based on the adjusted shared resource setting.

Thus, the embodiments described herein provide a number of unique advantages for power management in a multi-core processor. For example, coordinating power management in hardware coordination logic alleviates software overhead and calculation concerns. Furthermore, hardware coordination is relatively fast and obviates response time concerns associated with OS-coordinated power management. In addition, by managing power based on either a performance or a power policy, the processor is able to focus on what is currently the most important factor for software to control, while perhaps compromising the other.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A processor comprising:
a plurality of cores to issue a plurality of mismatched operating requirements for a shared resource that is shared among the plurality of cores; and
coordination logic coupled with the plurality of cores, the coordination logic to coordinate a shared resource setting for the shared resource that is shared among the plurality of cores based on the plurality of mismatched operating requirements and based further on which of a power saving policy or a high performance policy is identified as the most important to control.

2. The processor of claim 1:
wherein the coordination logic is to further select the shared resource setting according to a first operating requirement of a first core and a second operating requirement of a second core;
when the first operating requirement is not satisfied by the shared resource setting, the first core is to select an adjusted value for a first independent resource setting that enables the first operating requirement to be satisfied; and
when the second operating requirement is not satisfied by the shared resource setting, the second core is to select an adjusted value for a second independent resource setting that enables the second operating requirement to be satisfied.

3. The processor of claim 1:
wherein the coordination logic is to further coordinate the shared resource setting with an independent resource setting of at least one of the plurality of cores;
wherein the coordination logic is to select the shared resource setting according to a first operating requirement of a first core and a second operating requirement of a second core; and
wherein the first core is to select an adjusted value for the independent resource setting that enables the first operating requirement to be satisfied.

4. The processor of claim 1, wherein the coordination logic is to coordinate the shared resource setting with an independent resource setting of at least one of the plurality of cores, wherein the shared resource comprises power-related resources and associated controls that are shared among the plurality of processor cores, and further wherein the independent resource setting comprises other resources or controls that are dedicated to each given core among the plurality of processor cores.

5. The processor of claim 4, wherein the independent resource setting is to include a setting selected from a set including an independent clock throttle setting and an architecture throttle setting.

6. The processor of claim 4, wherein the coordination logic is to select the shared resource setting according to a first operating requirement of a first core and a second operating requirement of a second core, the first core to select an adjusted value for the independent resource setting that enables the first operating requirement to be satisfied.

7. The processor of claim 6:
wherein the coordination logic is to convert the first operating requirement into a first target value based on a power state transition table;
wherein the coordination logic is to convert the second operating requirement into a second target value based on the power state transition table;
wherein the coordination logic is to compare the first operating requirement to the second operating requirement;
wherein the coordination logic is to select the second target value as the shared resource setting when the second operating requirement is greater than the first operating requirement and report a corrected operating requirement that results from the shared resource setting to the first core;
wherein the first core is to select the adjusted value based on the corrected operating requirement; and
wherein the operating requirements are compared through a comparison between the corresponding target values.

8. The processor of claim 6:
wherein the second core is to issue a modified operating requirement that corresponds to a reduced second target value;
wherein the coordination logic is to adjust the shared resource setting based on the modified operating requirement;
wherein the first core is to adjust the independent resource setting based on the adjusted shared resource setting;
wherein the shared resource comprises power-related resources and associated controls that are shared among the plurality of processor cores; and
wherein the independent resource setting comprises other resources or controls that are dedicated to each given core among the plurality of processor cores.

9. The processor of claim 1:
wherein the coordination logic is to convert a first operating requirement from among the plurality of mismatched operating requirements into a first target value;
wherein the coordination logic is to convert a second operating requirement from among the plurality of mismatched operating requirements into a second target value; and
wherein the coordination logic is to further select a lesser value from among the first target value and the second target value when a minimum-of-both-requests coordination policy is in effect to force shared clock throttling for both the first and second processor cores.

10. The processor of claim 1, wherein the shared resource setting is selected from at least one of a voltage setting and a frequency setting.

11. The processor of claim 1, wherein the plurality of operating requirements includes a plurality of power requirements or a plurality of performance requirements, or both power requirements and performance requirements.

12. A method of managing power for a processor, the method comprising:
issuing a plurality of mismatched operating requirements for a shared resource that is shared among a plurality of processor cores; and
coordinating a shared resource setting for the shared resource that is shared among the plurality of processor cores based on the plurality of mismatched operating requirements and based further on which of a power saving policy or a high performance policy is identified as the most important to control.

13. The method of claim 12, wherein coordinating a shared resource setting comprises:
converting a first operating requirement from among the plurality of mismatched operating requirements into a first target value;
converting a second operating requirement from among the plurality of mismatched operating requirements into a second target value; and
selecting a lesser value from among the first target value and the second target value when a minimum-of-both-requests coordination policy is in effect to force shared clock throttling for both the first and second processor cores.

14. The method of claim 12, further including coordinating the shared resource setting with an independent resource setting of at least one of the plurality of processor cores, wherein the shared resource comprises power-related resources and associated controls that are shared among the plurality of processor cores, and further wherein the independent resource setting comprises other resources or controls that are dedicated to each given core among the plurality of processor cores.

15. The method of claim 12, wherein selecting the shared resource setting includes:
converting the first operating requirement into a first target value based on a power state transition table;
converting the second operating requirement into a second target value based on the power state transition table;
comparing the first operating requirement to the second operating requirement;
selecting the second target value as the shared resource setting if the second operating requirement is greater than the first operating requirement, wherein the operating requirements are compared through a comparison between the corresponding target values;
reporting a corrected operating requirement that results from the shared resource setting to the first core; and
selecting the adjusted value based on the corrected operating requirement.

16. The method of claim 12, wherein coordinating the shared resource setting further comprises selecting the shared resource setting according to a first operating requirement of a first processor core and a second operating requirement of a second processor core, and selecting an adjusted value for an independent resource setting that enables the first operating requirement to be satisfied.

17. The method of claim 12, wherein coordinating the shared resource setting includes coordinating the shared resource setting with a setting selected from a set including an independent clock throttle setting and an architecture throttle setting.

18. The method of claim 12, wherein coordinating the shared resource setting includes coordinating a setting selected from a set including a voltage setting and a frequency setting.

19. The method of claim 12, wherein coordinating the shared resource setting includes coordinating the shared resource setting with a plurality of power requirements, coordinating the shared resource setting with a plurality of performance requirements, or coordinating the shared resource setting with both power requirements and performance requirements.

20. A system comprising:
a clock source having a shared frequency setting; and
a processor coupled to the clock source, the processor having therein:
a plurality of cores to issue a plurality of mismatched operating requirements for a shared resource that is shared among the plurality of cores, and
coordination logic coupled with the plurality of cores, wherein the coordination logic is to coordinate a shared frequency setting for the shared resource that is shared among the plurality of cores based on the plurality of mismatched operating requirements and based further on which of a power saving policy or a high performance policy is identified as the most important to control.

21. The system of claim 20:
wherein the coordination logic is to convert a first operating requirement from among the plurality of mismatched operating requirements into a first target value;
wherein the coordination logic is to convert a second operating requirement from among the plurality of mismatched operating requirements into a second target value; and
wherein the coordination logic is to further select a lesser value from among the first target value and the second target value when a minimum-of-both-requests coordination policy is in effect to force shared clock throttling for both the first and second processor cores.

22. The system of claim 20:
wherein the coordination logic is to further select the shared resource setting according to a first operating requirement of a first core and a second operating requirement of a second core;
when the first operating requirement is not satisfied by the shared resource setting, the first core is to select an adjusted value for a first independent resource setting that enables the first operating requirement to be satisfied; and
when the second operating requirement is not satisfied by the shared resource setting, the second core is to select an adjusted value for a second independent resource setting that enables the second operating requirement to be satisfied.

23. The system of claim 20:
wherein the coordination logic is to further coordinate the shared resource setting with an independent resource setting of at least one of the plurality of cores;
wherein the coordination logic is to select the shared resource setting according to a first operating requirement of a first core and a second operating requirement of a second core; and
wherein the first core is to select an adjusted value for the independent resource setting that enables the first operating requirement to be satisfied.

24. The system of claim 20, wherein the coordination logic is to coordinate the shared resource setting with an independent resource setting of at least one of the plurality of cores, wherein the shared resource comprises power-related resources and associated controls that are shared among the plurality of processor cores, and further wherein the independent resource setting comprises other resources or controls that are dedicated to each given core among the plurality of processor cores.

25. The system of claim 24, wherein the independent resource setting is to include a setting selected from a set including an independent clock throttle setting and an architecture throttle setting.

26. The system of claim 24, wherein the coordination logic is to select the shared resource setting according to a first operating requirement of a first core and a second operating requirement of a second core, the first core to select an adjusted value for the independent resource setting that enables the first operating requirement to be satisfied.

27. The system of claim 26:
wherein the coordination logic is to convert the first operating requirement into a first target value based on a power state transition table;
wherein the coordination logic is to convert the second operating requirement into a second target value based on the power state transition table;
wherein the coordination logic is to compare the first operating requirement to the second operating requirement;
wherein the coordination logic is to select the second target value as the shared resource setting when the second operating requirement is greater than the first operating requirement and report a corrected operating requirement that results from the shared resource setting to the first core;
wherein the first core is to select the adjusted value based on the corrected operating requirement; and
wherein the operating requirements are compared through a comparison between the corresponding target values.

28. The system of claim 26:
wherein the second core is to issue a modified operating requirement that corresponds to a reduced second target value;
wherein the coordination logic is to adjust the shared resource setting based on the modified operating requirement;
wherein the first core is to adjust the independent resource setting based on the adjusted shared resource setting;
wherein the shared resource comprises power-related resources and associated controls that are shared among the plurality of processor cores; and
wherein the independent resource setting comprises other resources or controls that are dedicated to each given core among the plurality of processor cores.

29. The system of claim 20, wherein the shared resource setting is selected from at least one of a voltage setting and a frequency setting.

30. The system of claim 20, wherein the plurality of operating requirements includes a plurality of power requirements or a plurality of performance requirements, or both power requirements and performance requirements.

31. A method comprising:
issuing a first operating requirement from a first processor core;
issuing a second operating requirement from a second processor core, wherein the second operating requirement is mismatched with the first operating requirement;
translating the first operating requirement into a first target value;
translating the second operating requirement into a second target value;
comparing the first operating requirement to the second operating requirement;
selecting the second target value as a shared resource setting if the second operating requirement is greater than the first operating requirement;

selecting an adjusted value for an independent resource setting that enables the first operating requirement to be satisfied;

issuing a modified operating requirement from the second processor core;

adjusting the shared resource setting based on the modified operating requirement; and adjusting the independent resource setting based on the adjusted shared resource setting.

32. The method of claim 31, wherein issuing the modified operating requirement from the second processor core comprises:

selecting a lesser value from among the first target value and the second target value when a minimum-of-both-requests coordination policy is in effect to force shared clock throttling for both the first and second processor cores.

33. The method of claim 31:

wherein coordinating the shared resource setting includes coordinating the shared resource setting with a setting selected from a set including an independent clock throttle setting and an architecture throttle setting, each of the independent clock throttle setting and the architecture throttle setting being selected from among a voltage setting and a frequency setting.

* * * * *